United States Patent [19]
Perowne et al.

[11] Patent Number: 5,555,475
[45] Date of Patent: Sep. 10, 1996

[54] METHOD AND APPARATUS FOR GENERATING AN OUTPUT DEVICE CONTROL SIGNAL

[75] Inventors: Paul J. Perowne; George C. Manley; Richard A. Kirk, all of Herts, United Kingdom

[73] Assignee: Crosfield Electronics Limited, Herts, United Kingdom

[21] Appl. No.: 354,854

[22] Filed: Dec. 9, 1994

[30] Foreign Application Priority Data

Dec. 10, 1993 [GB] United Kingdom .............. 9325263

[51] Int. Cl.[6] .................................................. H04N 1/52
[52] U.S. Cl. ................................... 358/462; 358/533
[58] Field of Search ................................ 358/458, 462, 358/533–536

[56] References Cited

U.S. PATENT DOCUMENTS

| | | | |
|---|---|---|---|
| 4,004,079 | 1/1977 | Boston | 358/256 |
| 5,267,335 | 11/1993 | Mita | 358/462 |
| 5,426,519 | 6/1995 | Banton | 358/533 |

FOREIGN PATENT DOCUMENTS

| | | |
|---|---|---|
| 0560285 | 9/1993 | European Pat. Off. . |
| WO89/03150 | 4/1989 | WIPO . |
| WO90/04898 | 5/1990 | WIPO . |
| WO92/17979 | 10/1992 | WIPO . |

OTHER PUBLICATIONS

Patent Abstracts of Japan, vol. 13, No. 350, (E–800), Publication No. JP1109963, Apr. 26, 1989.

Patent Abstracts of Japan, vol. 12, No. 85, (E–591), Publication No. JP62220069, Sep. 28, 1987.

*Primary Examiner*—Stephen Brinich
*Attorney, Agent, or Firm*—Sughrue, Mion, Zinn, Macpeak & Seas

[57] ABSTRACT

A method of generating an output device control signal having portions representing the content of pixels of an image including at least two types of image content, in which data defining the content of each pixel of the image at a lower, first resolution and a higher, second resolution are passed respectively through a pair of processing paths, one corresponding to each image content type. A binary control signal is generated from the first resolution data in the first path by applying a stochastic screen. The binary control signal resulting from the stochastic screen is adapted to conform with the data at the second resolution, and the output device control signal is generated by combining data from the two processing paths.

22 Claims, 5 Drawing Sheets

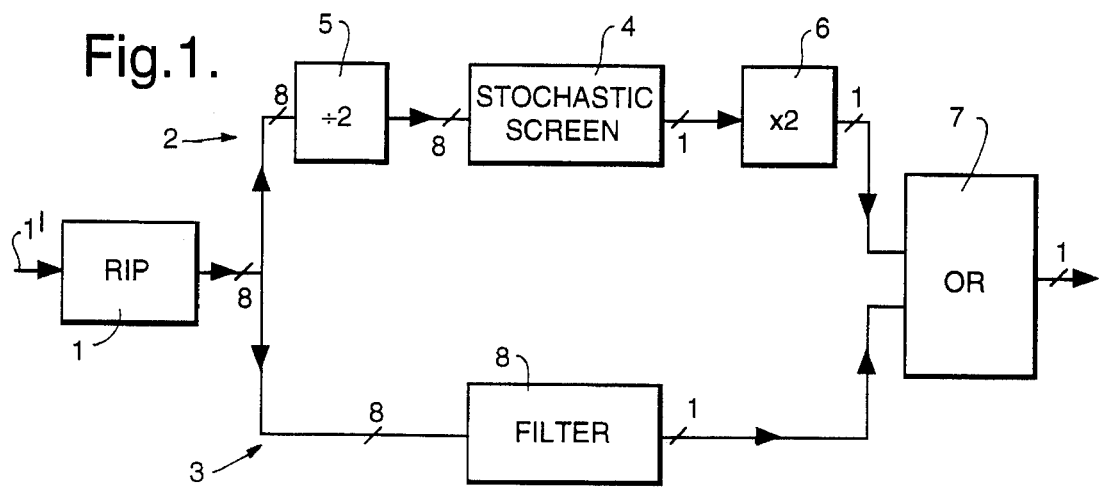
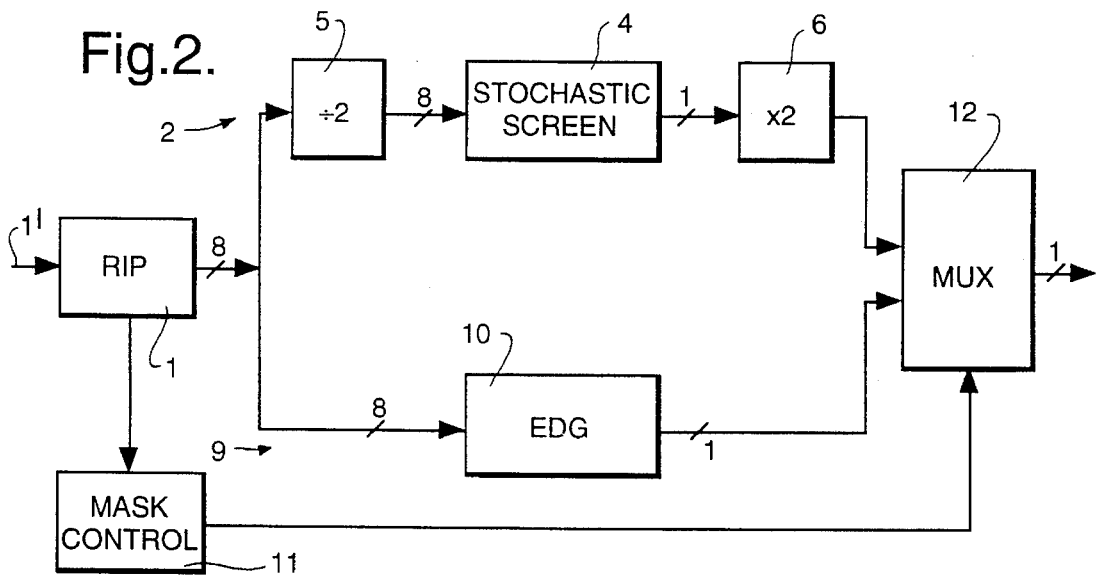
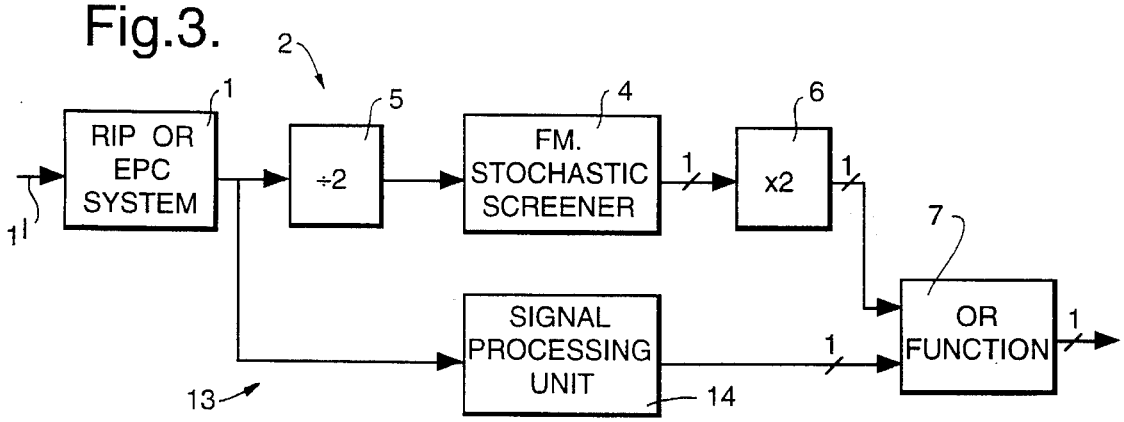

METHOD AND APPARATUS FOR GENERATING AN OUTPUT DEVICE CONTROL SIGNAL

FIELD OF THE INVENTION

The invention relates to methods and apparatus for generating an output device control signal having portions representing the content of pixels of an image.

DESCRIPTION OF THE PRIOR ART

Such control signals are used conventionally, for example to modulate a laser beam which exposes a film or a plate to generate half-tone dot separations and the like, on which directly images a press.

Conventionally, coloured images have been printed using half-tone technology in which dots are laid down on a rigid grid, the area of each dot varying depending upon the colour density component content of the corresponding pixel. This has led to problems of moiré and the like which have been solved by using different screen angles for different colour separations. Recently, a new type of screening technique has been developed known as stochastic screening (e.g. the Hell-Linotype Diamond screening device). Stochastic screening techniques vary the size, shape, and placement of dots through the use of statistical methods. In this way, the problems of moire and the like are avoided. Stochastic screening is particularly useful where the colour content of an image is changing but on occasion some problems arise in areas of flat tint where the stochastic nature of the screen becomes visible and in the case of line work or text where it is necessary to achieve very fine resolution but the output resolution from a stochastic screen is too coarse due to printing technology resolution units with this type of data.

This is because high quality text requires a minimum of around 2400 dpi resolution or else "jaggies" can be seen. However, because the stochastic screening process will break up the data structure using a pseudo random effect, the correlated grouping of text/picture/raster elements (textels) will not exist as in conventional (angled) screening (except for 100%) values.

This means that we are trying to print individual textels, i.e. a text element, the lowest addressable element in the output. Now, physical limitations in the print process mean that we cannot at present practically transfer (hold) ink from press roller etc. to media with elements less than around 14 microns (1800 dpi).

This therefore introduces a physical upper resolution limit of 1800 dpi with stochastic methods with current print technology. Note: it is the print technology and not the stochastic screening process which is the limit.

Therefore, the stochastic limit is 1800 dpi, and too low for good quality text reproduction which requires a minimum of 2400 dpi.

SUMMARY OF THE INVENTION

In accordance with one aspect of the present invention, a method of generating an output device control signal having portions representing the content of pixels of an image including at least two types of image content comprises:

passing data defining the content of each pixel of the image at a lower, first resolution and a higher, second resolution respectively through a pair of parallel processing paths, one corresponding to each image content type;

generating a binary control signal from the first resolution data in the first path by applying a stochastic screen;

adapting the binary control signal resulting from the stochastic screen to conform with the data at the second resolution; and generating the output device control signal by combining data from the two processing paths.

In accordance with a second aspect of the present invention, apparatus for generating an output device control signal having portions representing the content of pixels of an image including at least two types of image content comprises a pair of parallel processing paths to which data defining the content of each pixel of the image at a lower, first resolution and a higher, second resolution respectively is passed, one path corresponding to each image content type;

wherein the first path includes means for generating a binary control signal from the first resolution data by applying a stochastic screen, and means for adapting the binary control signal resulting from application of the stochastic screen to conform with the data at the second resolution; and combining means connected to the outputs from each path for generating the output device control signal by combining the data from the two paths.

The step of adapting the binary control signal may comprise increasing the resolution to the second, higher resolution using a replicator or averaging circuit. Alternatively the data may be adapted by delaying the rate at which the low resolution data is output from the stochastic processor, or achieving the same effect by installing a buffer downstream of the stochastic processor. In a further alternative, the step of adapting the data is carried out by the combining means which takes account of the fact that the two data streams are at a different resolution.

Typically, the first path includes means for reducing the resolution of the data.

The means for combining the data from the two processing paths may be a simple logic circuit (such as an OR gate). Alternatively, it may be a multiplexer which, for each portion of the output device control signal, selects data from one of the paths, chosen in dependence upon the image content type of the pixel corresponding to the control signal portion. The multiplexer may be controlled by a mask control device containing a fixed mask bit map. Alternatively, the multiplexer may be controlled by a device which detects portions of the image corresponding to one of the image types (e.g. HRE data), in which case it is controlled "on the fly".

We have devised a new approach to handling the electronic processing of image data which allows the use of stochastic screening where appropriate but in situations where such screening is not appropriate, a parallel path or paths is provided.

For example, in one application, two processing paths are provided, one for handling graphics data and the other for handling solid line work. In this case, the second processing path filters the input data to pass only data with a saturated or substantially saturated content (corresponding to line work or solid text) and each portion of the output control signal comprises data from the second path if it exists and otherwise data from the first path. In this way, the line work or text data is preferentially selected.

In this case, the apparatus preferably includes in the second processing path a filter and the combining means comprises a logic gate which combines signals from the first and second paths.

In other examples, the second processing path may process other types of graphic data, for example flat tint areas. In this case, the second processing path includes an electronic dot generator (of conventional (angled) form) and the apparatus further comprises a mask control device for controlling the combining means to output either data from the first path or data from the second path. A mask can be set up to define those areas corresponding to flat tints for which conventional electronic dot screening is appropriate and the combining means can be controlled by the mask to output data from the second processing path in those areas.

In some cases, the method comprises receiving the data at the second resolution, and reducing the resolution of the data in a first path to the first resolution which is acceptable for stochastic printing.

In a second approach, page information data is fed in parallel to data conversion means which generates the pixel data at the first and second resolutions respectively.

In a third approach, page information data is processed in successive passes to generate the first and second resolution data, the resultant data from at least the first pass being stored.

It will be understood that more than two paths could be provided and for example the apparatus could constitute three paths. One path handling graphics data for non-flat tint areas, one path handling graphics data in flat tint areas, and one path handling line work.

The apparatus may be implemented using individual hardware components or a suitably programmed computer.

BRIEF DESCRIPTION OF THE DRAWINGS

Some examples of apparatus and methods according to the invention will now be described with reference to the accompanying drawings, in which:

FIGS. 1–10 and 3A–3B are block diagrams of ten different examples; and,

FIGS. 7A to 10A are timing diagrams for the corresponding examples in FIGS. 7 to 10.

EMBODIMENT

Figure 3A:
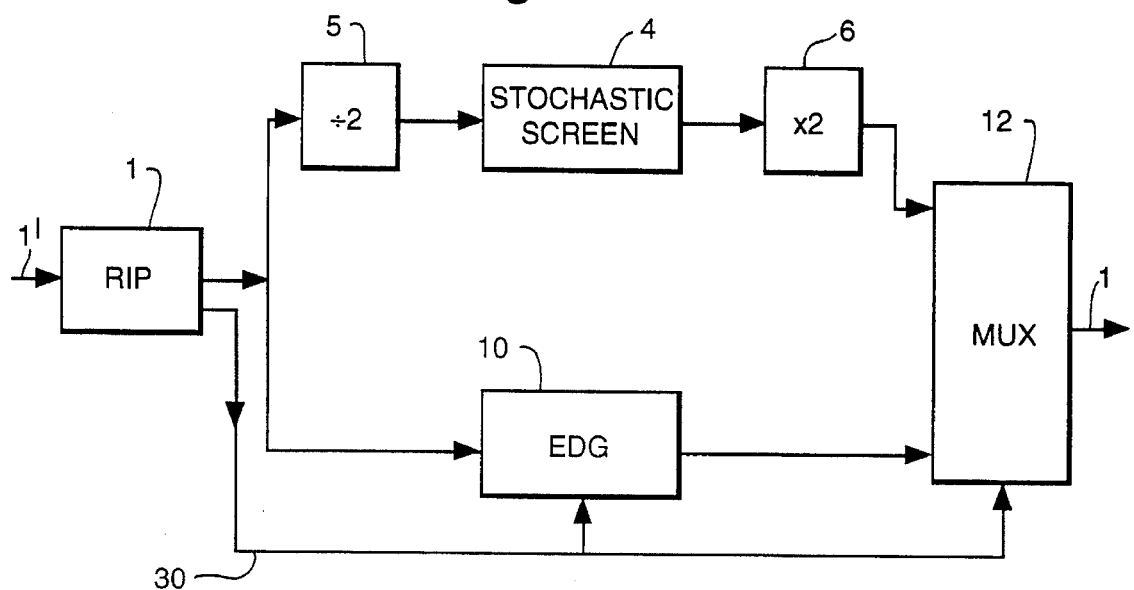

The apparatus shown in FIG. 1 comprises a page composition system or raster image processor (RIP) 1 of conventional form which is supplied with a page description file 1' defining the colour content of text or graphics elements in an image. Within a postscript RIP, this will be postscript data. The page composition system or RIP 1 formats this data into a raster format and the output data, for example comprising 32 bits (8 bit/colour component), is sent in parallel to a first path 2 and a second path 3 for further processing prior to output. In one example, the data has been processed at a resolution of 3600 pixels per inch. The first path 2 includes a stochastic screen system 4 of conventional form. However, the raw processed input resolution of the data is too high for current printing technology and the resolution is therefore reduced by a "divide-by-two" (averaging/decimation) circuit 5 to an acceptable resolution for printing. The reduced resolution data (1800 pixels per inch) is fed to the stochastic screen system 4 which outputs a binary control signal at the same resolution (1800 dpi) which is fed to a "multiply-by-two" (replication) circuit 6 which doubles the resolution of the binary control signal in both directions back to 3600 pixels per inch by replication and this is fed to an OR logic circuit 7. Alternatively, the replication circuit 6 may be replaced by an averaging circuit.

The second path 3 with input at 3600 dpi includes a filter 8 which is arranged only to pass data corresponding to pixels which are fully saturated (i.e. 100% text densities). This data is converted to a binary control signal and remains at the high resolution of 3600 pixels per inch and is also fed to the OR logic circuit 7 (i.e. binary 1 may correspond to saturated value).

Binary data presented to the OR circuit 7 must be synchronised to correspond i.e. text and non-text paths synchronised so that data generated from each single original input data sample corresponds when combined.

The ORed output signal is then fed as a control signal to a conventional output recorder with means to expose to film, plate, direct imaging or similar.

It will be appreciated that although conventional printing processes cannot handle individual pixels at a resolution of 3600 dpi, in the case of text, groups of such pixels will exist together with the result that the overall dot which is exposed will have a larger dimension which enables it to be printed.

In the example shown in FIG. 2, similar reference numerals have been used to indicate the same components. Thus, again, there is a path 2 for applying a stochastic screen to the input data. In this case, however, a path 9 is provided in parallel with the path 2 which includes a conventional electronic (angled) dot generator (EDG) 10 for applying a conventional half-tone dot screen to the incoming data. As mentioned above, the path 9 is more suitable for handling flat tint areas which would otherwise show detrimental noise effects if handled using the stochastic screen. Additionally, saturated text (100% in any colour separation) will also pass through the EDG with no screening applied.

In this instance, the OR circuit of the previous example is replaced by a multiplexer circuit 12. This is controlled via a mask control device 11 which has been previously programmed in a conventional manner to define those areas of the original image which constitute flat tint or text/line work. The mask could be generated for example by an interpretation process within a postscript RIP, an electronic page composition (EPC) system or dynamically derived using a signal or image processing technique from the data output from the RIP or EPC system. In such areas, the device 11 controls the multiplexer 12 to pass data from the path 9 while in other areas the multiplexer 12 passes data from the path 2. The resultant output signal is then utilised to modulate a laser as in the FIG. 1 example.

A third example is shown in FIG. 3 which is another method to maintain the integrity of the high resolution text edge. The high resolution data (3600 dpi) from the RIP or EPC system 1 is fed as before into parallel paths 2,13. The path 2 operates as before but in the path 13 a signal processing unit 14 is provided which filters out high resolution edge information. Once detected, a binary output stream will be generated, again at the high resolution (3600 dpi) and combined with the stochastically processed data via an OR circuit 7. This has the effect of introducing high resolution edge information with lower resolutions stochastically generated data. The algorithm implemented by the signal processing unit 14 may, for example, be an unsharp masking 2D filter type of process.

A fourth example is shown in FIG. 3A. In this case the RIP 1 generates HRE enable data which controls the multiplexer 12 and dot generator 10. The RIPs effectively generates an HRE mask "on the fly", and the multiplexer 12 outputs data from the EDG when the HRE enable signal 30 is "high" (i.e. in an edge region).

Figure 3B:
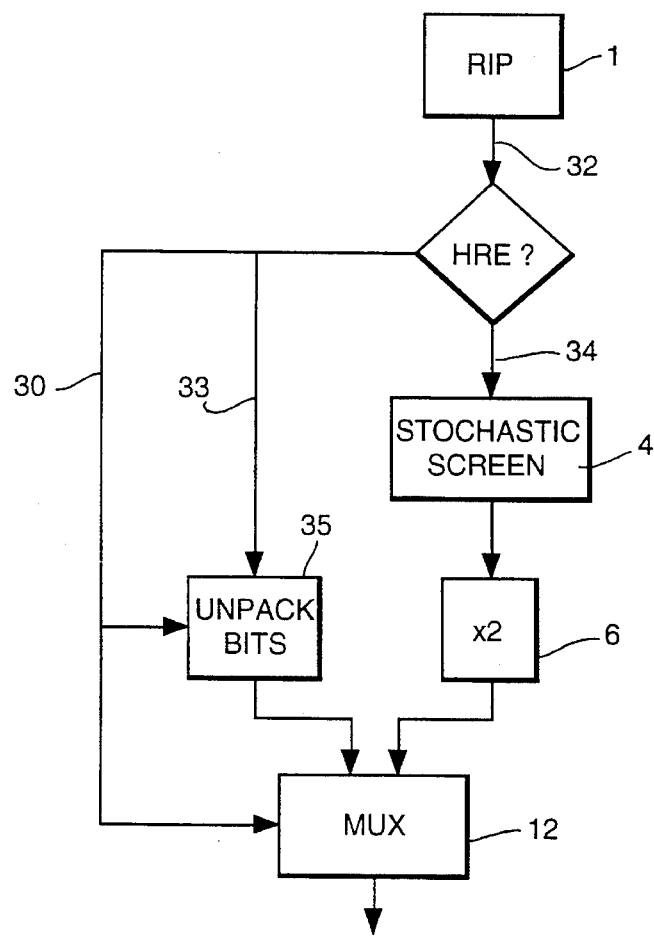

However, in most images very little of the image exists as edge data and therefore it is not necessary to have special hardware (i.e. the EDG 10) to handle it. Instead, it is possible to calculate the HRE elements in the RIP, as shown in FIG. 3B. In this case, the RIP outputs at 32 a merged HRE bit map and low resolution (divided by two) grey level codes. The low resolution (divided by two) grey level codes are transmitted along 34 and processed by the stochastic screener 4. The HRE bit map is transmitted along 33, where the bits are unpacked at 35 and output by the multiplexer 12 under control of the HRE enable signal 30.

Therefore, the RIP generates a code which the hardware unpacks into an FM/stochastic stream and an HRE overlay. The screening of the HRE data can be done in the RIP (if at all) and outputted as a bit map. This makes the hardware simpler while adding little computational burden to the RIP.

Figure 4:
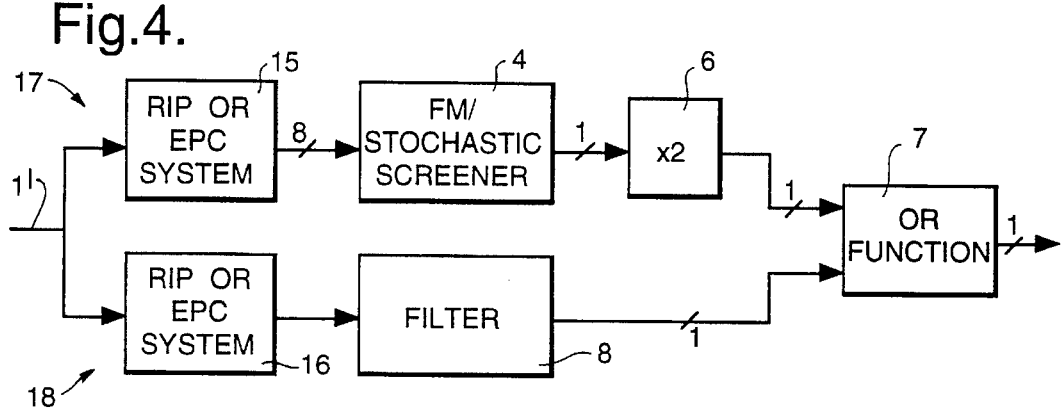
Figure 5:
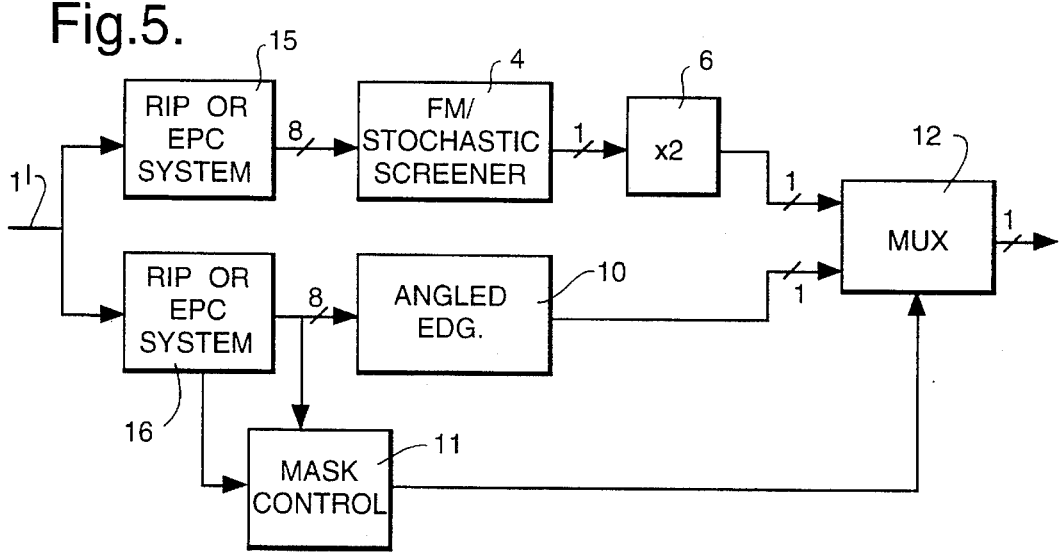
Figure 6:
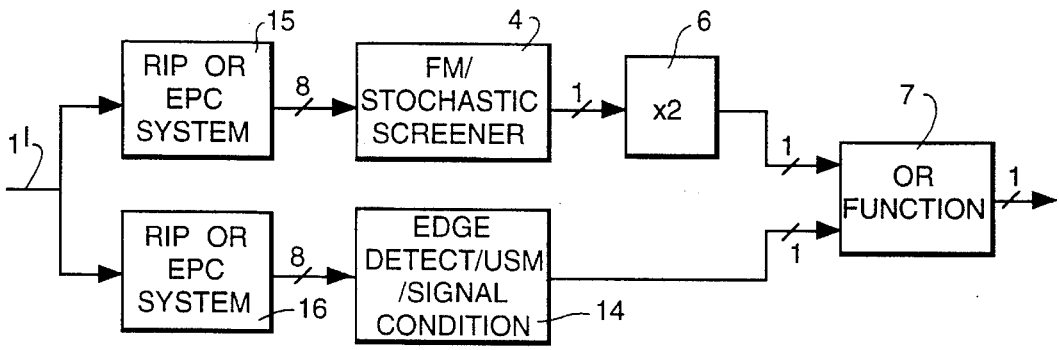

The examples shown in FIGS. 4–6 correspond to those shown in FIGS. 1–3 except that the original page description data is fed in parallel to a pair of RIP or EPC systems which generate output data at the required resolution for processing. The page description or information data may comprise any conventional form of data which defines a page to be printed. A typical example is Postscript Data defining aspects of a page such as location of images, text and the like. In the case of FIG. 4, a pair of RIP or EPC systems 15,16 are provided in respective processing paths 17,18. The systems 15,16 convert the input page description data to raster image data. The data output from the system 15 is at 1800 dpi (low resolution) while the data output from the system 16 is at 3600 dpi (high resolution). The data is then fed to a stochastic screen system 4 and then to a replicator 6 as in the FIG. 1 example while the data from the system 16 is fed to a filter 8, again as in the FIG. 1 example. The outputs from the replicator 6 and filter 8 are fed to an OR circuit 7 to be output as binary control to a laser modulator.

In a similar way, FIGS. 5 and 6 correspond to FIGS. 2 and 3 respectively but with additional RIP or EPC systems which generate output data at the required resolution. A detailed description of these two embodiments will not therefore be given. However, the reference numerals used in FIGS. 5 and 6 are the same for those components which are also to be found in FIGS. 2 and 3. The image processing unit 14 may carry out an unsharp masking or edge detection/filtering process.

As an alternative to a pair of RIPs or EPCs, we could use a single RIP or EPC but process the data through it twice to output at the required resolution. The Crosfield MagnaRIP used by the Magnasetter 750 processes text and graphics files at different resolutions.

Figure 7:
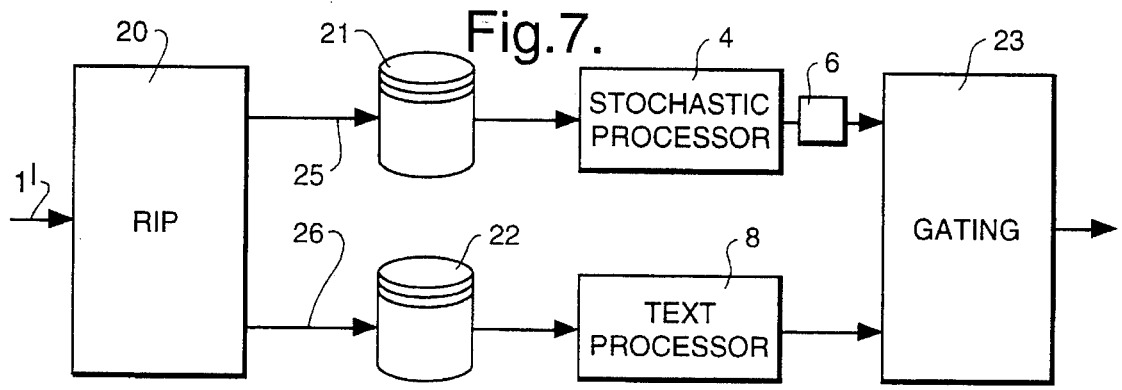

Some examples where a single RIP or EPC is used are shown in FIGS. 7–10. In FIG. 7, a single RIP 20 is provided to which the page description data 1' such as Postscript Data is fed. As shown in the timing diagram of FIG. 7A (where the timing of various processes is illustrated, with time moving from left to right), in a first pass 25 the RIP generates contone data at 1800 dpi (indicated at 30 in FIG. 7A) which is stored 3 on a disk store 21. In a second pass 26, the RIP generates contone data at 3600 dpi (31) which is stored on a disk store 22. The data in the two stores 21,22 is then simultaneously fed 34,35 from the stores 21,22 through the stochastic processor 4 and text processor 8 (indicated in the timing diagram 7A at 32 and 33 respectively) to a gating unit 23 such as an OR gate for output 36. Before being input to the OR gate the low resolution data output from the stochastic processor 4 is replicated by replicator 6 to increase its resolution to 3600 dpi.

Figure 7A:
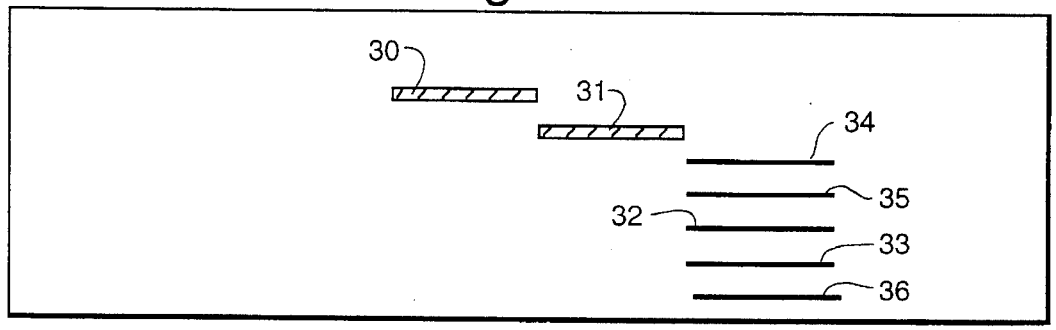
Figure 8:
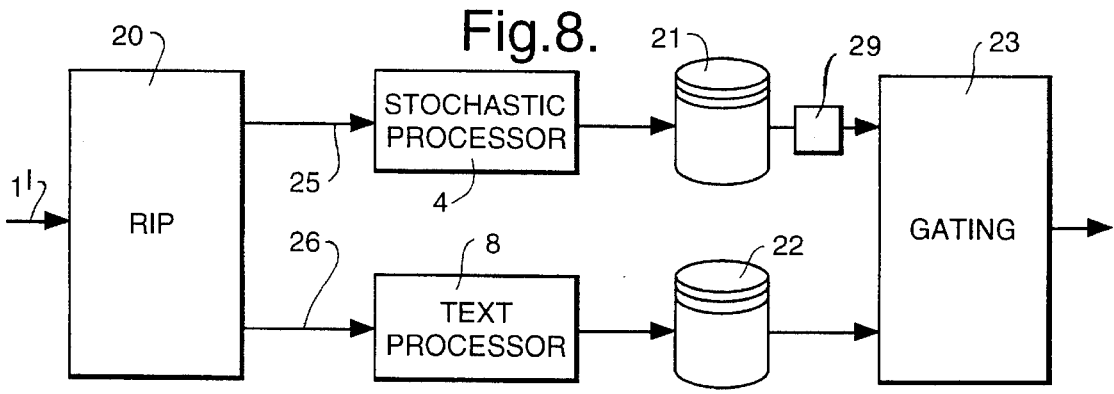
Figure 8A:
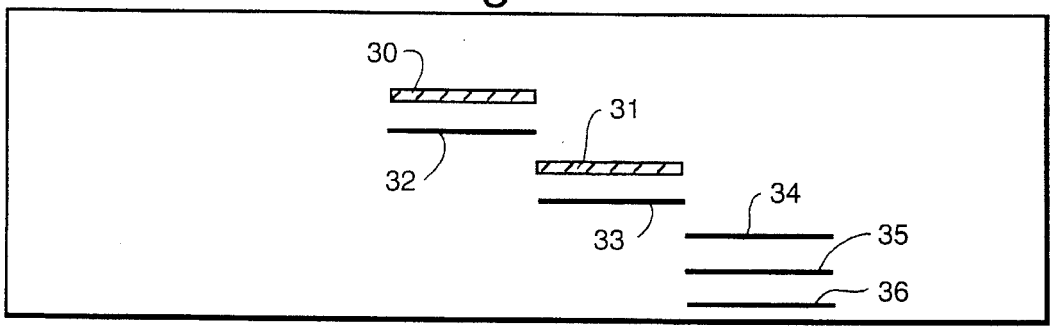

FIGS. 8 and 8A illustrate an example similar to FIG. 7 except that the data is stored downstream of the processing units 4,8 (the same. reference numerals are used as in FIG. 7A). The replicator 6 in FIG. 7 is replaced with a buffer 29 downstream of the disk store 21. This delays the rate at which the low resolution data is output to the gating unit 23, so that the two data streams are synchronised and can be combined to produce an output stream at 3600 dpi.

Figure 9:
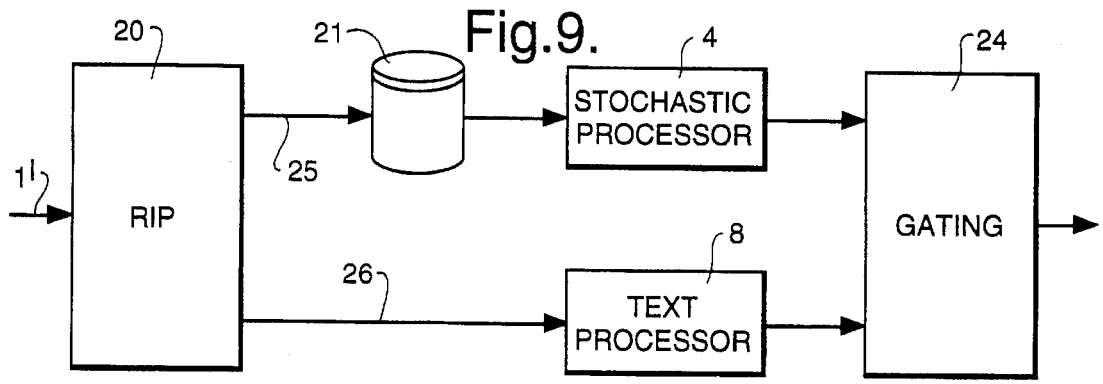
Figure 9A:
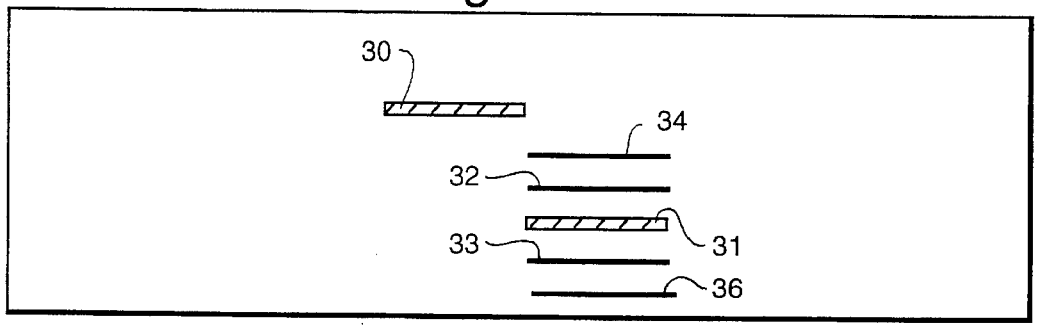

In FIGS. 9 and 9A, data at 1800 dpi is generated in a first pass 25 and stored on a disk store 21. This data is then downloaded to the stochastic processor 4 simultaneously with a second pass 26 by the RIP generating data at 3600 dpi which is fed through the text processing unit 8. In this case, no specific replicator or buffer is used, and the gating unit 24 adapts the two data streams to conform with each other so that they can be combined to produce an output data stream at the required high resolution.

Figure 10:
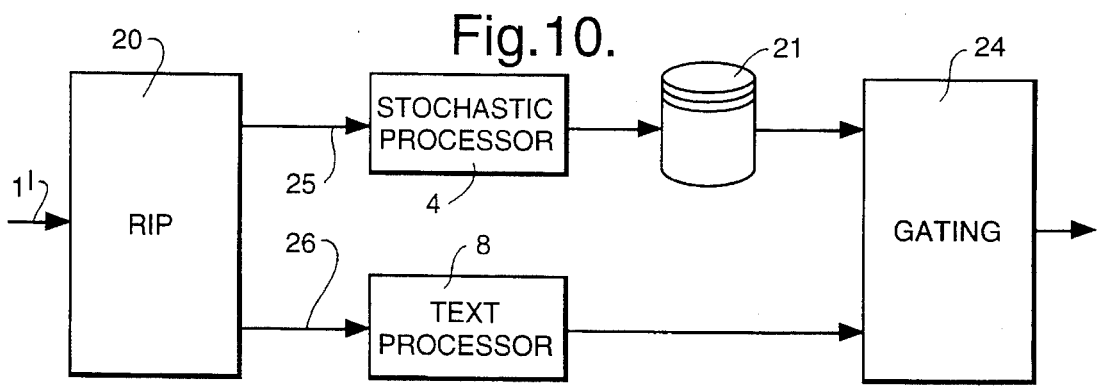
Figure 10A:
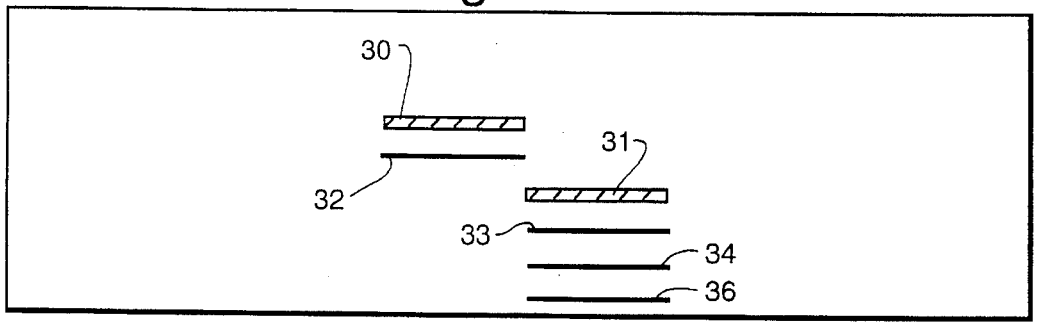

The FIGS. 10 and 10A examples are similar to FIGS. 9 and 9A except that the data at 1800 dpi is stored downstream of the stochastic processing unit 4.

The examples given use ORing or multiplexing as methods of gating the parallel paths, but the same might be achieved by any logical gating which achieves the same effect.

We claim:

1. A method of generating an output device control signal having portions representing the content of pixels of an image including at least two types of image content comprising:

passing data defining the content of each pixel of the image at a lower, first resolution and a higher, second resolution respectively through a pair of processing paths, one corresponding to each of said image content types;

generating a binary control signal from said first resolution data in said first path by applying a stochastic screen;

adapting the binary control signal resulting from said stochastic screen to conform with the data at said second resolution; and generating said output device control signal by combining data from said two processing paths.

2. A method according to claim 1, wherein said first path includes means for reducing the resolution of said data.

3. A method according to claim 1, wherein said combining step comprises performing an "OR" operation on data from said two paths.

4. A method according to claim 1, wherein said combining step comprises, for each portion of said output device control signal, selecting data from one of said paths, chosen in dependence upon the image content type of the pixel corresponding to said control signal portion.

5. A method according to claim 1, wherein a first of said two types of image content comprises graphics data, and a second type comprises line work, solid text, high resolution edge information or flat tint areas.

6. A method according to claim 5, wherein data defining the first type of image content is passed through the first path.

7. A method according to claim 5, wherein data defining the second type of image content is passed through the second path.

8. A method according to claim 1, wherein said binary control signal is adapted by increasing its resolution to the second resolution.

9. A method according to claim 1, wherein the first and second resolution data are processed in successive passes, the resultant data from at least the first pass being stored.

10. Apparatus for generating an output device control signal having portions representing the content of pixels of an image including at least two types of image content comprising a pair of parallel processing paths (2,3) to which data defining the content of each pixel of the image at a lower, first resolution and a higher, second resolution are respectively passed, one path corresponding to each image content type;

wherein the first path includes means (4) for generating a binary control signal from the first resolution data by applying a stochastic screen, and means (6,29,24) for adapting the binary control signal resulting from application of the stochastic screen to conform with the data at the second resolution; and combining means (7,12,23,24) connected to the outputs from each path for generating the output device control signal by combining the data from the two paths.

11. Apparatus according to claim 10, wherein the combining means comprises an OR logic circuit (7).

12. Apparatus according to claim 10, wherein the combining means comprises a multiplexer (12).

13. Apparatus according to claim 10, wherein the second path comprises filter means (8,14) which only passes data representing one of the types of image content.

14. Apparatus according to claim 12, further comprising mask control means (11) which defines areas of the image with one of the types of image content, the mask control means controlling the multiplexer (12) with a mask control signal whereby data is selected from the paths in accordance with the mask control signal.

15. Apparatus according to claim 10, wherein the second path comprises means (8,14) to filter out high resolution edge data.

16. Apparatus according to claim 10, further comprising a raster image processor (1,15) (RIP) which produces the data defining the colour content of the image.

17. Apparatus according to claim 16, wherein the RIP (1) produces data at the higher, second resolution, and the first path (2) includes means to reduce the resolution to the lower, first resolution.

18. Apparatus according to claim 16, wherein the RIP (16) produces data at the higher resolution and inputs it along the second path (18), further comprising a second RIP which produces lower resolution data and inputs it along the first path (17).

19. Apparatus according to claim 10, wherein the second path further comprises means to produce a binary control signal at the higher resolution.

20. Apparatus according to claim 10, wherein the means for adapting the binary control signal comprises a replicating circuit for increasing the resolution to the second resolution.

21. Apparatus according to claim 10, wherein the resolution increasing means comprises a replicator.

22. Apparatus according to claim 10, wherein the means for adapting the binary control signal comprises a buffer.

* * * * *